US009600290B2

(12) United States Patent
Inoue

(10) Patent No.: US 9,600,290 B2
(45) Date of Patent: Mar. 21, 2017

(54) CALCULATION METHOD AND APPARATUS FOR EVALUATING RESPONSE TIME OF COMPUTER SYSTEM IN WHICH PLURALITY OF UNITS OF EXECUTION CAN BE RUN ON EACH PROCESSOR CORE

(71) Applicant: INTERNATIONAL BUSINESS MACHINES CORPORATION, Armonk, NY (US)

(72) Inventor: Hiroshi Inoue, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/570,203

(22) Filed: Dec. 15, 2014

(65) Prior Publication Data
US 2015/0169380 A1  Jun. 18, 2015

(51) Int. Cl.
G06F 9/46  (2006.01)
G06F 9/38  (2006.01)
G06F 9/50  (2006.01)

(52) U.S. Cl.
CPC .......... *G06F 9/3885* (2013.01); *G06F 9/5088* (2013.01)

(58) Field of Classification Search
CPC .... G06F 6/4881; G06F 9/5066; G06F 8/4442; G06F 11/3409; G06F 9/3851; G06F 9/5088; G06F 9/5083; G06F 9/3885; H04L 47/72; H04L 67/10; H04L 29/12339
See application file for complete search history.

(56) References Cited

U.S. PATENT DOCUMENTS

| 2009/0049443 A1* | 2/2009 | Powers | H04L 67/10 718/100 |
| 2010/0070730 A1* | 3/2010 | Pop | G06F 8/4442 711/167 |
| 2010/0077403 A1* | 3/2010 | Yang | G06F 9/4881 718/104 |

(Continued)

FOREIGN PATENT DOCUMENTS

| JP | 2000298593 A | 10/2000 |
| JP | 2004213624 A | 7/2004 |

(Continued)

*Primary Examiner* — Tuan Vu
(74) *Attorney, Agent, or Firm* — F. Chau & Associates, LLC

(57) ABSTRACT

A calculation method for evaluating response time in a computer system in which a plurality of units of execution are run on individual processor cores. The calculation method evaluates response time in a computer system in which a plurality of units of execution are run in parallel on individual processor cores while sharing internal hardware resources. The method includes the steps of: normalizing the utilization state of the computer system with the state of parallelism of the units of execution and evaluating the utilization state; and calculating an expected value of response time in a desired state of parallelism of the units of execution from the normalized utilization state on the basis of queueing theory in which changes in average single-thread performance of the units of execution according to the parallel running state are taken into account.

10 Claims, 7 Drawing Sheets

(56) References Cited

U.S. PATENT DOCUMENTS

| | | | | |
|---|---|---|---|---|
| 2010/0250642 A1* | 9/2010 | Yellin | ............... | G06F 11/3409 |
| | | | | 709/201 |
| 2010/0322252 A1* | 12/2010 | Suganthi | ........... | H04L 29/12339 |
| | | | | 370/395.53 |
| 2011/0302372 A1* | 12/2011 | Fontenot | ............... | G06F 9/3851 |
| | | | | 711/122 |
| 2012/0130680 A1 | 5/2012 | Zink et al. | | |
| 2012/0179938 A1 | 7/2012 | Nijhawan et al. | | |
| 2012/0297163 A1* | 11/2012 | Breternitz | ............. | G06F 9/5066 |
| | | | | 712/22 |
| 2014/0379924 A1* | 12/2014 | Das | ........................ | H04L 47/72 |
| | | | | 709/226 |

FOREIGN PATENT DOCUMENTS

| | | |
|---|---|---|
| JP | 2011515776 | 5/2011 |
| JP | 2012128771 A | 7/2012 |

\* cited by examiner (A)

(B)

CALCULATION METHOD AND APPARATUS FOR EVALUATING RESPONSE TIME OF COMPUTER SYSTEM IN WHICH PLURALITY OF UNITS OF EXECUTION CAN BE RUN ON EACH PROCESSOR CORE

CROSS-REFERENCE TO RELATED APPLICATION

This application claims priority under 35 U.S.C. §119 from Japanese Patent Application No. 2013-259975 filed Dec. 17, 2013, the entire contents of which are incorporated herein by reference.

BACKGROUND OF THE INVENTION

1. Technical Field

The present invention relates to a computer system in which a plurality of units of execution can be run on each processor core. More specifically, the present invention relates to a calculation method and apparatus for evaluating response time of a computer system in which a plurality of units of execution can be run on each processor core.

2. Background Art

Many high-performance processors have the function of processing a plurality of hardware threads in parallel on each processor core using a simultaneous multi-threading (SMT) technique. The SMT function can increase the peak throughput of servers by increasing the hardware resource utilization of processors.

In running an application on an actual system, the number of CPUs necessary for the system is estimated, and time performance is estimated with a system. For example, Japanese Unexamined Patent Application Publication No. 2012-128771 discloses a method for predicting performance in a multi-tenant environment in which service programs for a plurality of users run simultaneously in a single system. Japanese Unexamined Patent Application Publication No. 2004-213624 discloses a technique for calculating a queue time to adjust the number of threads in a thread pool. Japanese Unexamined Patent Application Publication No. 2000-298593 discloses a queueing model in which a processor conflict due to a plurality of tasks is taken into account to correctly predict the degree of improvement in performance relative to the degree of parallelism and the performance index of parallel computers in a multitask environment.

Queueing theory is often used to evaluate the time performance of systems. However, the queueing theory of the related art cannot predict correct behavior of computer systems having the SMT function described above.

SUMMARY OF THE INVENTION

Accordingly, one aspect of the present invention is a computer-implemented calculation method for evaluating a response time in a computer system in which a plurality of units of execution are run in parallel on individual processor cores while sharing internal hardware resources, the method including: normalizing the utilization state of the computer system with the state of parallelism of the units of execution and evaluating the utilization state; and calculating an expected value of response time in a desired state of parallelism of the units of execution from the normalized utilization state on the basis of queueing theory, in which changes in an average single-thread performance of the units of execution according to the parallel running state are taken into account.

Another aspect of the present invention is a non-transitory computer readable storage medium tangibly embodying a computer readable program code having computer readable instructions which, when implemented, cause a computer device to carry out the steps of the method stated above.

Another aspect of the present invention is a calculation apparatus for evaluating response time in a computer system, in which a plurality of units of execution are in parallel on individual processor cores while sharing internal hardware resources, the apparatus including: a utilization-state evaluation section for normalizing the utilization state of the computer system with the state of parallelism of the units of execution and evaluating the utilization state; and a response time calculation section for calculating an expected value of response time in a desired state of parallelism from the normalized utilization state on the basis of queueing theory, in which changes in average single-thread performance of the units of execution according to the parallel running state are taken into account.

Another aspect of the present invention is a computer system, in which a plurality of units of execution are run in parallel on a plurality of individual processor cores while sharing internal hardware resources, the computer system including: a utilization-state evaluation section for normalizing the present utilization state of the computer system with the state of parallelism of the units of execution and evaluates the utilization state; and a setting update unit for updating the setting of the state of parallelism of units of execution used on the basis of association information associating the state of parallelism of the units of execution used with the utilization state from the normalized present utilization state in which: the association information is information that associates the state of parallelism; an expected value of response time is optimized with the individual utilization states; and the expected value being calculated on the basis of queueing theory in which changes in average single-thread performance of the units of execution according to the parallel running state are taken into account.

BRIEF DESCRIPTION OF THE DRAWINGS

FIG. 2 diagram (A) shows an embodiment in which the method for adjusting the number of active threads is implemented as a user-space daemon running on the operating system kernel; and FIG. 2 diagram (B) shows another embodiment in which the method for adjusting the number of active threads is directly implemented as a task scheduler constituting the operating system kernel.

DETAILED DESCRIPTION OF THE PREFERRED EMBODIMENT

Technical Problems

Figure 1:
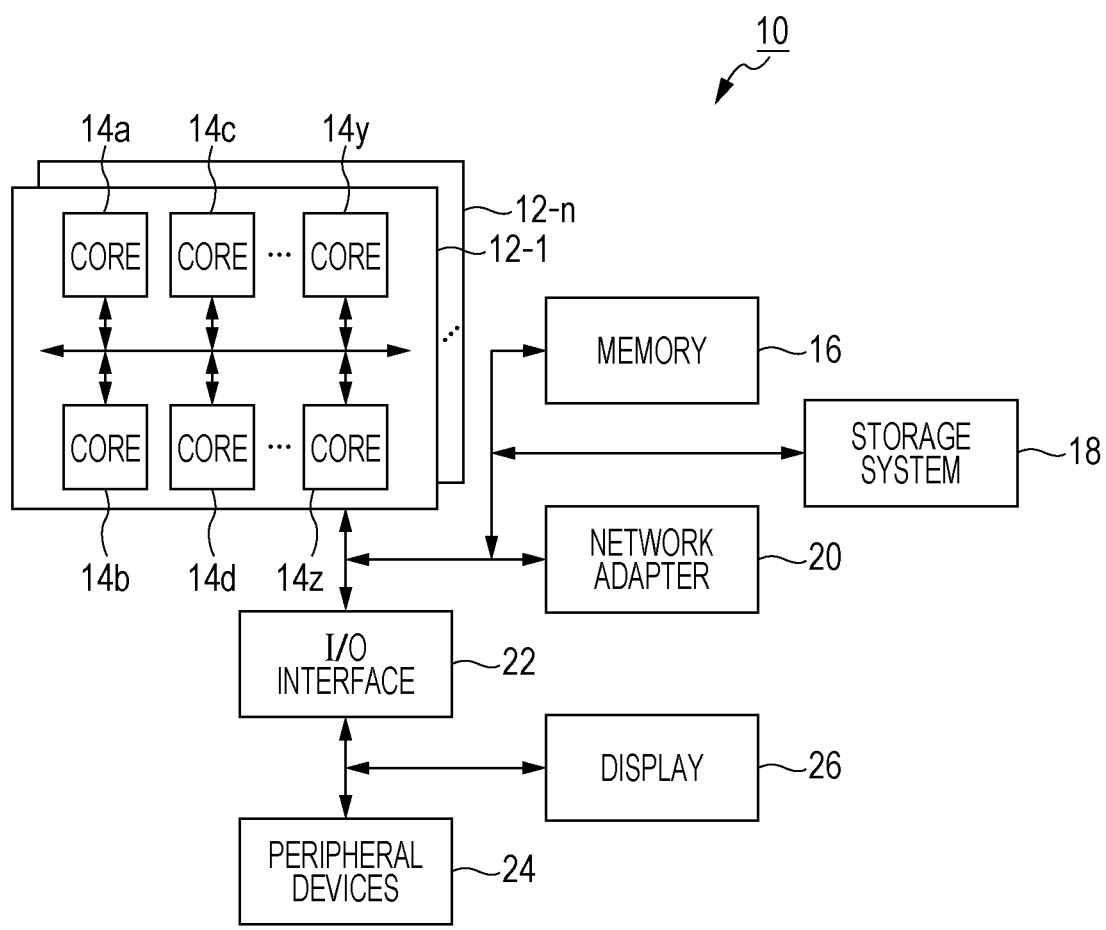
FIG. 1 is a diagram showing the hardware configuration of a computer system for executing a method for adjusting the number of active threads according to an embodiment of the present invention.

As described above, queueing theory is often used to evaluate the time performance of systems. However, the queueing theory of the related art cannot predict correct behavior of computer systems having the SMT function described above. For example, a queueing model in which the number of logical CPUs (the number of cores×the number of threads per unit core) in a system is the number of windows cannot give a prediction result that matches the actual behavior of the system.

This can be because the SMT technique can increase the number of logical CPUs but can decrease single thread performance due to a conflict of internal hardware resources with the other threads because of simultaneous execution of a plurality of hardware threads. Another probable cause is the influence of the action of a task scheduler of the operating system.

Particularly for applications in which many short-time tasks are generated, such as a Web application, a response time is also important in addition to the peak throughput. This is because improving the response time can greatly improve user experience. It is generally thought that maximizing the number of hardware threads that are simultaneously executed is better to increase the throughput. However, an in-depth study of the inventor showed that, in the case where the entire CPU utilization in a plurality of processor cores is low, a decrease in single thread performance due to a conflict between the threads significantly affects the response time described above in spite of the advantage of an increase in peak throughput owing to SMT.

The related art disclosed in Japanese Unexamined Patent Application Publication No. 2012-128771 and Japanese Unexamined Patent Application Publication No. 2000-298593 is a technique that uses a queue to evaluate the performance when a plurality of items of software are simultaneously executed in a single system. The related art disclosed in Japanese Unexamined Patent Application Publication No. 2004-213624 uses a queue to dynamically adjust the number of threads in a thread pool in multi-thread programming. The relate art disclosed in these Japanese Unexamined Patent Applications does not consider a decrease in single thread performance in the SMT environment in which a plurality of hardware threads are run in parallel in each processor core.

From such a background, it is required to create a new model capable of predicting the response time of a computer system in which a plurality of units of execution can be run in parallel on each processor core while sharing internal hardware resources. Furthermore, it is required to develop a new technique for determining an optimum state of parallelism of units of execution depending on the load condition of the computer system on the basis of such a new model, thereby achieving both an increase in throughput and an improvement in response time.

The present invention is made in consideration of the problems of the related art, and the present invention provides a calculation method for a computer system in which a plurality of units of execution can be run in parallel on individual processor cores while sharing internal hardware resources, the method being capable of evaluating response time in the state of parallelism of predetermined units of execution in consideration of a conflict among the units of execution.

The present invention also provides a calculation apparatus and a program for a computer system in which a plurality of units of execution can be run in parallel on individual processor cores while sharing internal hardware resources, the apparatus and program being capable of evaluating response time in the state of parallelism of predetermined units of execution in consideration of a conflict among the units of execution.

Further, the present invention provides a computer system in which a plurality of units of execution can be run in parallel on individual processor cores while sharing internal hardware resources, the system being capable of determining the state of parallelism of units of execution depending on a load exerted on the system and capable of improving the response time particularly under a low load.

Solution to the Problems

To solve the problems of the related art, the present invention provides a calculation method having the following characteristics for evaluating the response time of a computer system in which a plurality of units of execution can be run in parallel on individual processor cores while sharing internal hardware resources. The calculation method includes the steps of a computer normalizing the utilization state of the computer system with the state of parallelism of the units of execution and evaluating the utilization state; and the computer calculating an expected value of response time in a desired state of parallelism of the units of execution from the normalized utilization state on the basis of queueing theory in which changes in average single-thread performance of the units of execution according to the parallel running state are taken into account.

The present invention provides a computer system having the following characteristics. The computer system includes a utilization-state evaluation section that normalizes the present utilization state of the computer system with the state of parallelism of the units of execution and evaluates the utilization state; and a setting update unit that updates the setting of the state of parallelism of units of execution used on the basis of association information that associates the state of parallelism of the units of execution used with the utilization state from the normalized present utilization state. The association information is information that associates the state of parallelism in which an expected value of response time is optimized with the individual utilization states, the expected value being calculated on the basis of queueing theory in which changes in average single-thread performance of the units of execution according to the parallel running state are taken into account.

Furthermore, the present invention provides a calculation apparatus for evaluating the response time of the computer system and a program for implementing a computer as the calculation apparatus.

Advantageous Effects of the Invention

The above configuration allows a computer system in which a plurality of units of execution can be run in parallel on individual processor cores while sharing internal hardware resources to evaluate response time in the state of parallelism of predetermined units of execution in consideration of a conflict among the units of execution.

Detailed Explanation

Although embodiments of the present invention are described hereinbelow, the present invention is not limited to the following embodiments. In the following embodiments, a calculation method for evaluating the response time of a computer system is described using an example method for adjusting the number of active threads executed in a computer system having the SMT function, which evaluates response time in the case where the SMT function is enabled under individual numbers of hardware threads in the present utilization state and which adjusts the number of active threads to an optimum number.

FIG. 1 is a diagram showing the hardware configuration of a computer system 10 for executing a method for adjusting the number of active threads according to an embodiment of the present invention. The computer system 10 shown in FIG. 1 is a general-purpose computer, such as a server computer, a work station, or a personal computer.

The computer system 10 includes one or a plurality of processors 12-1 to 12-$n$, a memory 16, and a storage system 18. The processor 12 is typically a multi-core processor with a symmetric multi-processing (SMP) configuration, such as a POWER7®, POWER8®, or XEON®, although not particularly ® limited thereto. The processor 12 supports an SMT function enabling a predetermined maximum number of hardware threads (hereinafter simply referred to as threads) to run on each of processor cores 14. This embodiment can evaluate a computer system including processors having an SMT function that allows a plurality of threads to be simultaneously run in parallel on each processor core 14. The hardware threads each constitute a unit of execution in this embodiment.

An example of the memory 16 is a dynamic random access memory (DRAM), which provides a work space to the processor 12. Examples of the storage system 18 include a hard disk drive (HDD) and a solid state drive (SSD), which store an operating system, applications, and various programs, such as a software component for executing the method for adjusting the number of active threads according to this embodiment.

The computer system 10 can further include a network adapter 20. The network adapter 20 connects the computer system 10 to a network, such as a local area network (LAN), a wide area network (WAN), or a public network (for example, the Internet). The computer system 10 can communicate with peripheral devices 24, such as a keyboard and a pointing device, and a display 26 via an I/O interface 22.

The components 12 to 24 constituting the computer system 10 are connected together via various paths including a fabric path, a memory path, and an I/O path. The computer system 10 according to this embodiment achieves functional parts and processes, described later, by having the processor 12 read various programs from the storage system 18 and develop the programs in the work space provided by the memory 16.

Figure 2:
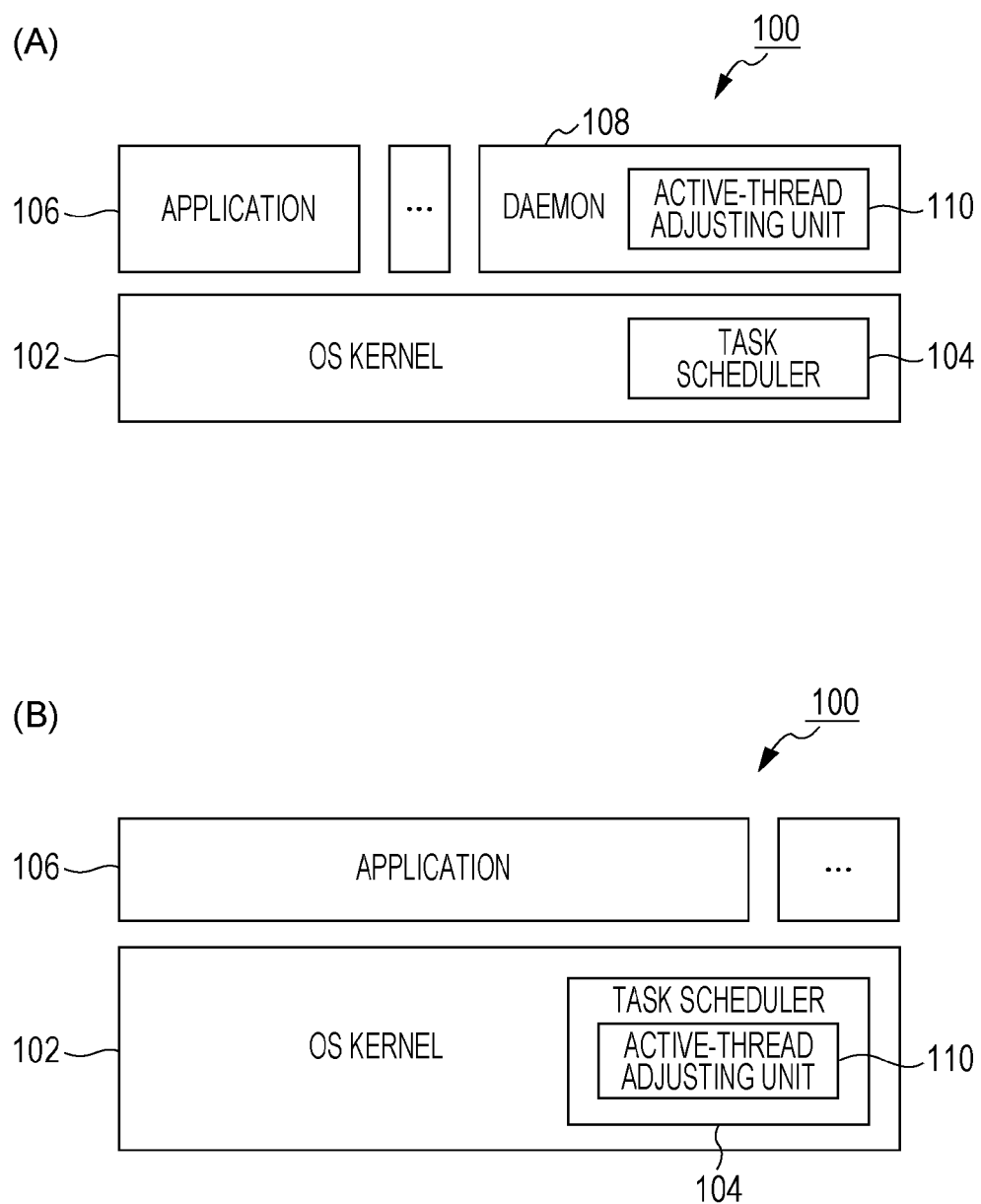
FIG. 2 shows software configurations of the computer system according to embodiments of the present invention. More specifically.

FIG. 2 shows software configurations 100 of the computer system 10 according to embodiments of the present invention. FIG. 2(A) shows an embodiment in which the method for adjusting the number of active threads according to this embodiment of the present invention is implemented as a user-space daemon 108 running on an operating system (hereinafter referred to as an OS) kernel 102. In contrast, FIG. 2(B) shows another embodiment in which the method for adjusting the number of active threads according to this embodiment of the present invention is directly implemented as a task scheduler 104 constituting the OS kernel 102.

The OS kernel 102 is the heart of a LINUX® server OS or client OS, such as RedHat Enterprise Linux®, a UNIX® server OS or client OS, such as AIX®, or a Windows® server OS or client OS, such as Windows®, although not limited thereto. In both embodiments, the OS kernel 102 recognizes the individual hardware threads running on each processor core 14 as logical CPUs, calculates the utilization states of the CPUs, and stores the utilization states. Furthermore, the OS kernel 102 provides an interface for setting the number of active threads. In the embodiments described below, the number of threads activated in each processor core 14 can be designated in the range from one corresponding to a case where SMT is disabled to a maximum number that the processor 12 supports. In these embodiments, the same number of active threads is designated to all the processor cores 14 for the convenience of explanation. In another embodiment, the method for adjusting the number of active threads can be configured so that an independent number of active threads is designated for each processor core 14.

The task scheduler 104 included in the OS kernel 102 assigns CPU resources necessary for executing processes in order to minimize the response time to real-time tasks and to maximize the entire CPU utilization. An example of the task scheduler 104 is Completely Fair Scheduler (CFS) for a Linux® kernel 2.6.23 or later.

In both embodiments, an application 106 is any of applications including a Web application and a database application running on the OS or a combination thereof. The application 106 processes a request from a client by using a plurality of threads that the processor 12 provides.

The method for adjusting the number of active threads according to an embodiment of the present invention can be implemented by an active-thread adjusting unit 110 of the user-space daemon 108, which accesses the OS kernel 102 for the SMT function via the interface, as shown in FIG. 2(A). In another embodiment, the active-thread adjusting unit 110 can be directly implemented in the task scheduler 104 constituting the OS kernel 102, as shown in FIG. 2(B).

Figure 3:
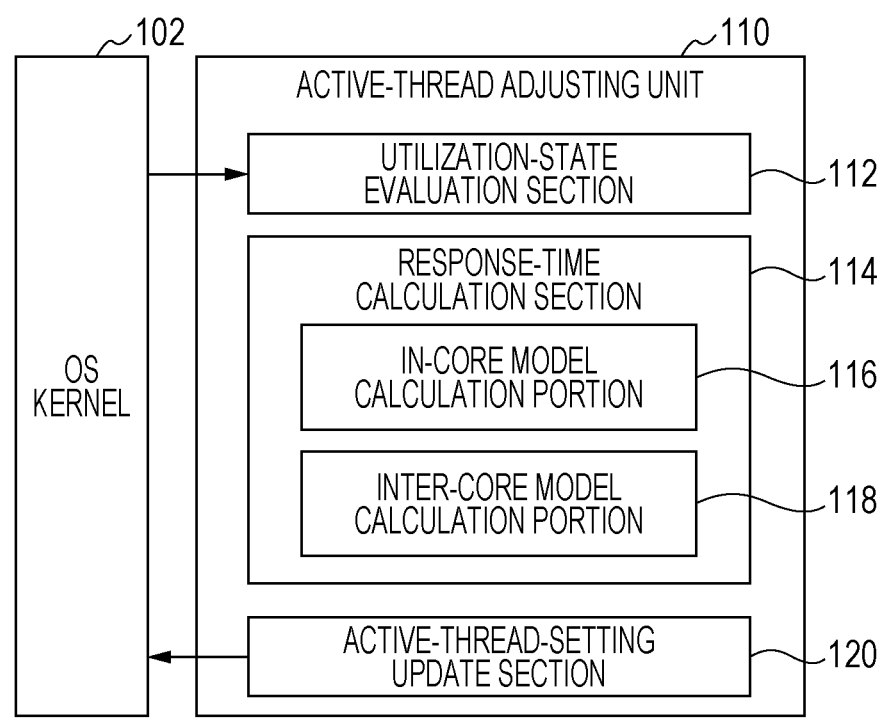
FIG. 3 is a detailed functional block diagram of an active-thread adjusting unit according to an embodiment of the present invention.
Figure 4:
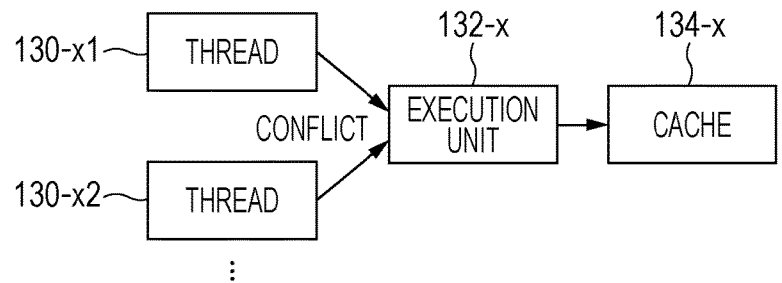
FIG. 4 diagram (A) illustrates a conflict of internal hardware resources between threads in the same processor core and FIG. 4 diagram (B) illustrates task migration between processor cores.
Figure 4:
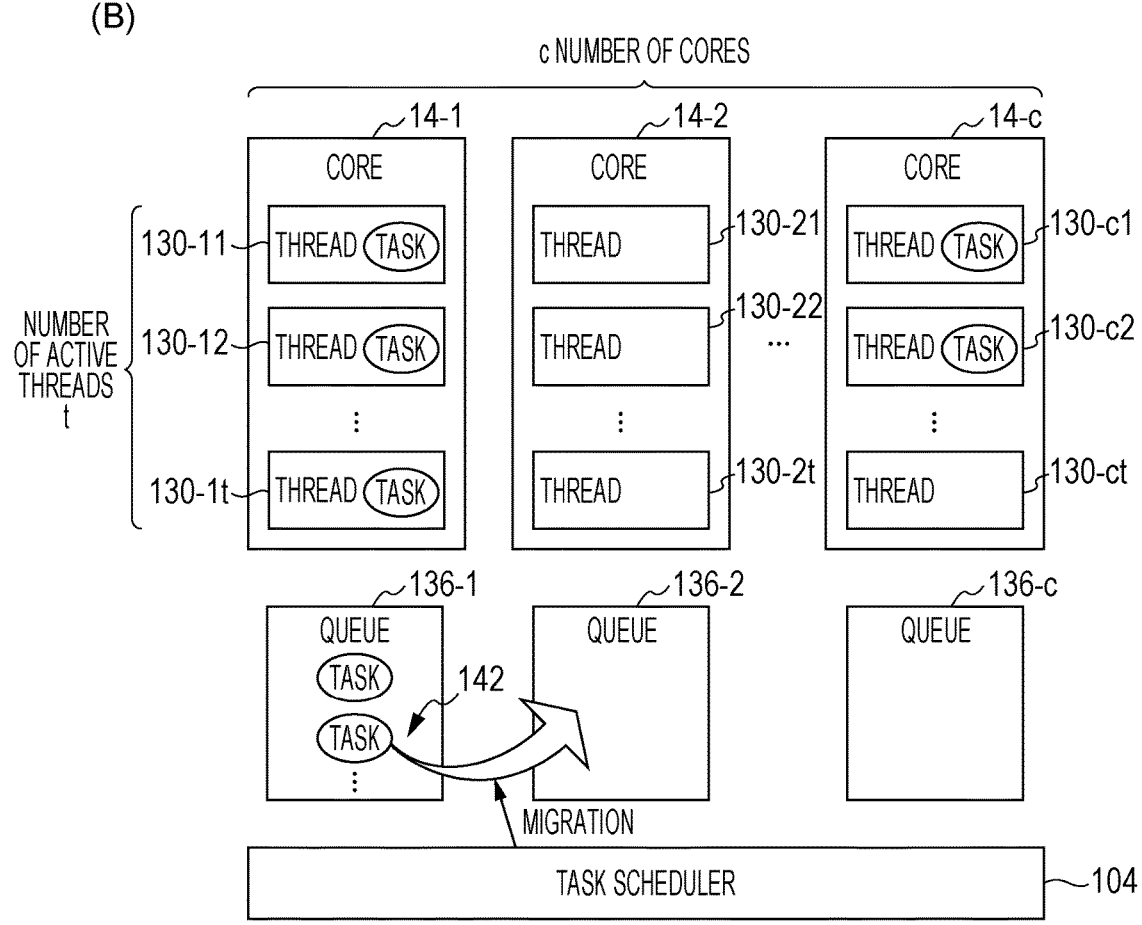

Referring to FIGS. 3 to 5, the method for adjusting the number of active threads according to an embodiment of the present invention is described in more detail. As described above, the SMT technique can increase the throughput by simultaneously executing a plurality of threads in parallel, but can decrease a single thread performance due to a conflict of internal hardware resources with the other threads. In particular, when the entire CPU utilization in a plurality of processor cores is low, a decrease in the single thread performance due to a conflict among threads exerts a significant influence to decrease the response time. In other words, a suitable number of active threads in the computer system 10 depends on the load, and thus, it is not always suitable to fix the number of active threads used in the computer system 10 to a maximum value supported by the processor 12 support.

Thus, the active-thread adjusting unit 110 of this embodiment performs control of predicting and evaluating response time when the number of active threads are changed depending on the present CPU utilization state and dynamically adjusting the setting to an optimum number of active threads under the prediction.

FIG. 3 is a detailed functional block diagram of the active-thread adjusting unit 110 according to an embodiment of the present invention. The active-thread adjusting unit 110 of this embodiment includes a utilization-state evaluation section 112, a response time calculation section 114, and an active-thread-setting update section 120.

The utilization-state evaluation section 112 regularly obtains CPU utilization information from the OS kernel 102, normalizes the present utilization state of all the CPUs of the computer system 10 with the degree of parallelism of the threads, and evaluates the utilization state. When the computer system 10 operates in a state in which some number of active threads (including SMT disabled) or a combination thereof is set, the utilization-state evaluation section 112 evaluates the present utilization state of all the CPUs irrespective of the state of parallelism of threads used. Typically, the normalized utilization state is evaluated as CPU utilization that is presumed to be necessary to process the present load when the SMT function is disabled (that is, the number of active threads is 1).

The response-time calculation section 114 calculates an expected value of response time in a desired state of parallelism of threads from the normalized and estimated present utilization state on the basis of queueing theory in which changes in average single thread performance according to the parallel running state of the threads are taken into account. Typically, an expected value of response time is calculated for each of the numbers of active threads ($1 \leq t \leq t_{max}$, where $t_{max}$ is the largest number of threads to be supported) on the assumption that the same number of active threads is set to all the processor cores 14.

The active-thread-setting update section 120 accesses the OS kernel 102 via an interface to update the setting on the number of active threads to be used on the basis of the calculated expected value of response time. Typically, the number of active threads with which the expected value of response time is optimized is determined as the number of active threads to be used in the present utilization state. The response time evaluated is an average response time in this embodiment. Accordingly, the number of active threads is updated to a number with which the expected value of the average response time is the smallest.

More specifically, the response-time calculation section 114 includes an in-core model calculation portion 116 and an inter-core model calculation portion 118.

FIG. 4(A) shows a state in which a plurality of threads 130-x1 and 130-x2 running in parallel in the same processor core 14 share hardware resources, such as an execution unit 132-x and a cache 134-x, in the processor 12. Although the plurality of threads 130-x1 and 130-x2 in the same processor core 14 enhances the entire performance by sharing the internal hardware resources to increase the resource utilization efficiency, a conflict of internal hardware resources occurs between the threads 130-x1 and 130-x2. Therefore, the CPUs can be recognized as logical CPUs according to the number of threads in terms of software; however, the performance of each logical CPU (thread) decreases depending on the degree of parallelism of simultaneously running threads.

For example, with a POWER7® processor, if the number of active threads is 2, the entire performance can be increased to about 150%, whereas the single thread performance can decrease to about 75% of that when the SMT function is disabled. If the number of active threads is a maximum support value 4, the entire performance can be increased to about 180%, whereas each single thread performance can decrease to about 45%.

Thus, the in-core model calculation portion 116 performs calculation using a queueing model in which a conflict among threads in the processor core 14 is modeled, as shown in FIG. 4(A). Here, the in-core model calculation portion 116 calculates a waiting time for a queue in which the number of active threads in each processor core 14 is the number of windows without consideration of influences from the other processor cores 14. In this case, average single thread performance changes depending on the number of busy windows (the number of simultaneously running threads) in the processor core 14 at some instant. The in-core model calculation portion 116 takes in changes in the average single thread performance as changes in an average service factor to calculate a waiting time for the queue.

FIG. 4(B) shows an operation of the task scheduler 104 for moving a waiting task 142 to another processor core 14-2 with a low load when the number of tasks assigned to a processor core 14-1 exceeds the number of active threads. Although the task scheduler 104 of a typical OS actively moves tasks in each processor core 14 to distribute the loads, the task scheduler 104 passively moves tasks to other processor cores 14 unless the numbers of executable tasks across the processor cores 14 are significantly biased. Therefore, even if a queueing model in which the sum of threads across a plurality of processor cores 14 (the number of cores×the number of active threads per core) is the number of windows is used on the assumption that the task scheduler 104 simply and impartially moves tasks to individual threads, the behavior cannot be correctly predicted.

Thus, in this embodiment, the inter-core model calculation portion 118 performs calculation using a queueing model in which task migration between processor cores 14 performed by the task scheduler 104 is modeled, as shown in FIG. 4(B), on the basis of the result of calculation performed by the in-core model calculation portion 116. The inter-core model calculation portion 118 calculates the probability of presence of a processor core that can accept a task from another processor core (a core, such as a processor core 14-2 having no executable task shown in FIG. 4(B)) for a queue with the number of windows across a plurality of processor cores 14 and calculates an expected value of response time in consideration of the probability that the task is moved between cores.

Figure 5A:
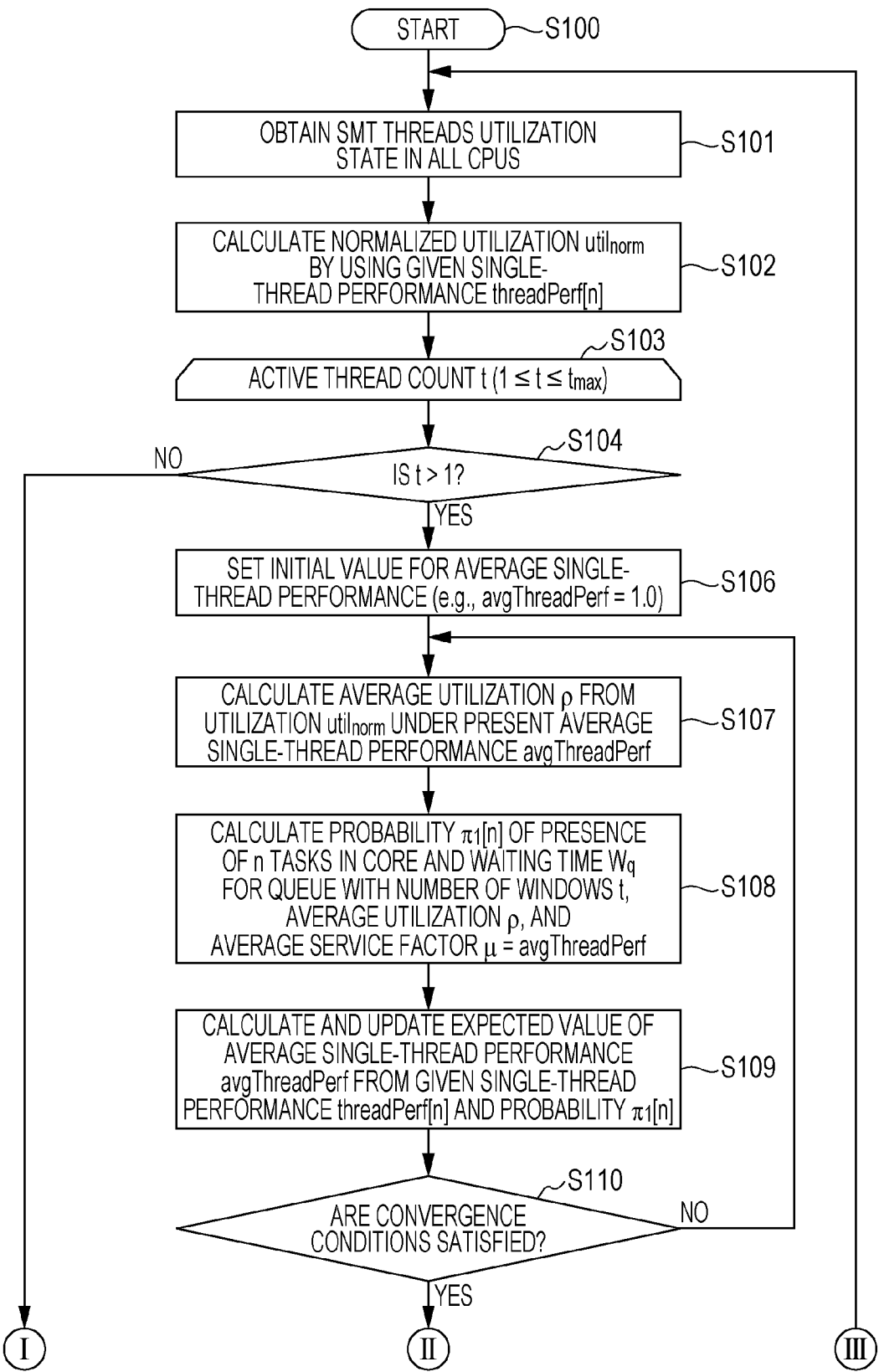
FIG. 5A is a flowchart showing the method for adjusting the number of active threads of the computer system according to an embodiment of the present invention.
Figure 5B:
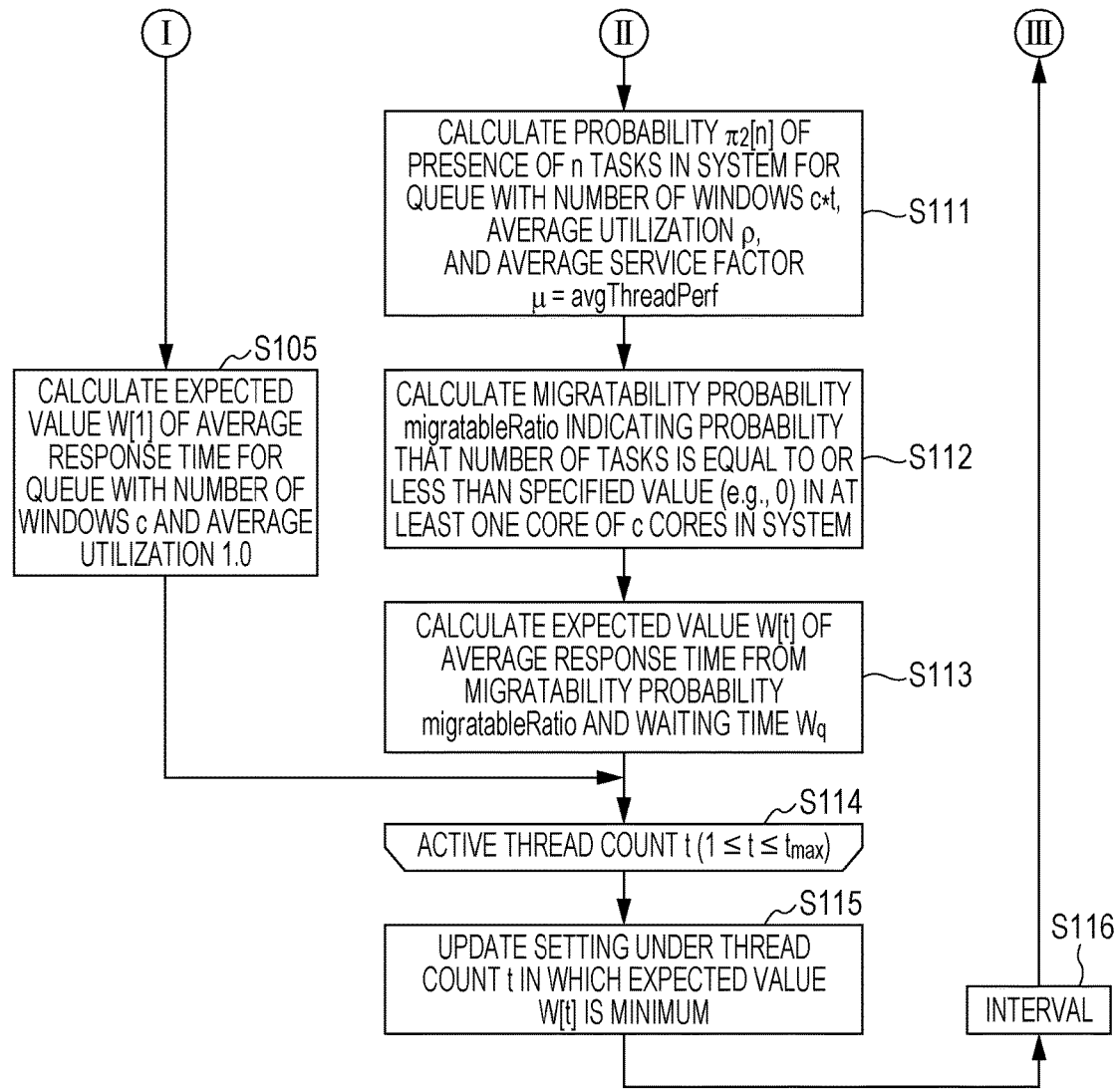
FIG. 5B is a flowchart showing the method for adjusting the number of active threads of the computer system according to an embodiment of the present invention.

Referring to FIGS. 5A and 5B, the details of processes executed in the in-core model calculation portion 116 and the inter-core model calculation portion 118 is described in more detail. FIGS. 5A and 5B show a flowchart for the method for adjusting the number of active threads that the computer system 10 executes according to an embodiment of the present invention. The process shown in FIGS. 5A and 5B is started from step S100 in response to the start of the computer system 10.

In step S101, the computer system 10 obtains the utilization state of all CPU threads with the utilization-state evaluation section 112. The OS typically holds CPU utilization information for each logical CPU (thread) (e.g., the time that the system consumed or the CPU utilization itself), from which the utilization of each logical CPU is obtained.

In step S102, the computer system 10 calculates, with the utilization-state evaluation section 112, normalized utilization $util_{norm}$ from the obtained utilization of each logical CPU with reference to a case in which the number of active threads is 1. Here, to calculate the normalized utilization $util_{norm}$, a single thread performance threadPerf[n] is defined, which indicates a single thread performance when programs are simultaneously executed in n number of threads as a ratio to a value when the SMT function is disabled. The single thread performance threadPerf[1] of a single thread is 1.0. If n>1, 0<threadPerf[n]≤1.0 holds. The entire performance of all the threads running in the processor cores 14 is expressed as threadPerf[n]×n.

For example, if threadPerf[2] is 0.8, the single-thread performance of each thread is 80%, but two threads can be run in parallel, and thus, the entire performance of the processor cores 14 can increase to 1.6 times. For the value of single thread performance threadPerf[n], a value corresponding to the present load can be dynamically obtained using a measuring device, such as a performance counter, or a typical value can be statically defined. Since how much the single-thread performance decreases when a plurality of threads are run probably depends on the application, the accuracy can be increased in a preferred embodiment by obtaining ThreadPerf[n] during execution and taking it into account for modelling.

In step S102, more specifically, the utilization-state evaluation section 112 calculates normalized utilization $util_{norm}$ from the utilization $util[n](1 \leq n \leq t_{max})$ of each logical CPU measured for each processor core 14 using the single thread performance threadPerf[n]. If the number of threads is 2 or more, the normalized utilization $util_{norm}$ can exceed 1. Since this is for an in-core model, the utilization $util_{norm}$ is calculated as an average utilization $util_{norm}$ per processor core.

For example, with a POWER7® processor, since the CFS (Linux® kernel 2.6.23 or later) runs the threads in the processor cores in the order of logical CPU identification number, the smallest number first, by asymmetry SMT scheduling, $util[n_1] > util[n_2]$ holds for $n_1 < n_2$. This can be considered that util[n]−util[n+1] is consumed by thread number (the degree of parallelism) n. For example, if util[1] is 80%, util[2] is 50%, and the number of active threads is 2, 30% is regarded as being consumed by thread number 1, and 50% is regarded as being consumed by thread number 2. Accordingly, normalized utilization $util_{norm}$=(threadPerf[1]×1)×30%+(threadPerf[2]×2)×50%.

In contrast, with a processor that does not use asymmetric SMT scheduling, 40% (=util[1]×util[2]) is regarded as being consumed by thread number 2, and 50% (=util[1]+util[2]−2×util[1]×util[2]) is regarded as being consumed by thread number 1. Accordingly, $util_{norm}$=(threadPerf[1]×1)×50%+(threadPerf[2]×2)×40%.

After the evaluation of the utilization state, in the loop from step S103 to step S114, the process from step S104 to step S113 is executed for the individual number of active threads t ($1 \leq t \leq t_{max}$) assumed.

In step S104, the process branches depending on whether the assumed number of active threads t is 1 or not. If it is determined in step S104 that the assumed number of active threads t is 1 (t>1: NO), the process branches to step S105. In this case, a thread conflict due to SMT does not occur, and thus, an expected value W[1] of an average response time is calculated in step S105 as a queue with the number of windows c, that is, M/M/c. The expected value W[1] of an average response time can be obtained as a value obtained by adding the average service time of the window, $1/\mu$ to an average waiting time Wq from arrival to reception of service. Here, since the shortest response time is to be selected, the average service factor $\mu$=1.0 is assumed. In step S104, if it is determined that the assumed number of active threads t exceeds 1 (t>1: YES), the process branches to step S106.

In steps S106 to S110, the in-core model calculation portion 116 assumes appropriate average single thread performance avgThreadPerf for the number of active threads t in a processor core without consideration of influences from the other processor cores, performs calculation for a queue using a multi-window model, and iteratively updates the assumption of the average single thread performance depending on the calculation result.

Here, average single thread performance when the present load is executed using the SMT function is expressed as the ratio, avgThreadPerf, to single thread performance without using the SMT function. If the number of active threads is t, the single thread performance avgThreadPerf has the relationship expressed as threadPerf[t]≤avgThreadPerf≤1.0. This is because even if t number of threads are active, only t or less tasks can be actually executed, and thus only a smaller number of threads sometimes run. Thus, the average single thread performance avgThreadPerf can be higher than the single thread performance threadPerf[t] when the program is actually executed in the t number of threads.

In step S106, the computer system 10 sets an initial value to the average single thread performance with the in-core model calculation portion 116. Here, avgThreadPerf=1.0 can be set on the assumption that a decrease in performance due to the SMT function does not occur. In step S107, the computer system 10 calculates average utilization $\rho$ when t number of threads are used from utilization $util_{norm}$ per normalized processor core on the assumption of the present single thread performance avgThreadPerf with the in-core model calculation portion 116. The average utilization $\rho$ can be calculated using Eq. (1).

[Math. 1]

$$\rho = \frac{util_{norm}}{i * avgThreadPerf} \quad (1)$$

In step S108, the computer system 10 calculates, with the in-core model calculation portion 116, the probability $\pi_1[n]$ that n number of tasks are present in the processor core (system) and an average waiting time Wq for a queue with the number of windows t, average utilization $\rho$, and an average service factor $\mu$=avgThreadPerf. Assuming a queue of M/M/t, the probability $\pi_1[n]$ and the average waiting time Wq can be calculated using Eqs. (2) to (4). The average waiting time Wq indicates a waiting time until execution authority is given when the number of tasks exceeds the number of threads.

[Math. 2]

$$\pi_1[0] = \left[\sum_{n=0}^{i-1} \frac{t^n \rho^n}{n!} + \frac{t^{t-1}\rho^t}{(t-1)!(1-\rho)}\right]^{-1} \quad (2)$$

$$\pi_1[n] = \begin{cases} \frac{t^n \rho^n}{n!}\pi_1[0] & (0 \leq n < t) \\ \frac{t^t \rho^n}{t!}\pi_1[0] & (n \geq t) \end{cases} \quad (3)$$

$$W_q = \frac{t^{t-1}\rho^t}{(t-1)!(1-\rho)^2 \mu}\pi_1[0] \quad (4)$$

In step S109, the computer system 10 calculates an expected value of the average single thread performance from the given single thread performance threadPerf[n] and the distribution of the probability $\pi_1[n]$ of the calculated number of tasks n and updates avgThreadPerf with the in-core model calculation portion 116. The expected value of the average single thread performance can be calculated using Eq. (5), where $\pi_1[t]$ in the number of active threads t is the probability that all the windows are busy, $\pi_1[n \le t]$.

[Math. 3]

$$avgThreadPerf = \sum_{n=1}^{t} \pi_1[n] \cdot threadPerf[n] \qquad (5)$$

In step S110, the computer system 10 determines, with the in-core model calculation portion 116, whether or not convergence conditions are satisfied. If it is determined in step S110 that the convergence conditions are not satisfied (NO), the process is returned to step S107, and the calculation is performed again under the updated average single thread performance avgThreadPerf. In contrast, if it is determined in step S110 that the convergence conditions are satisfied (YES), the process goes to step S111.

The convergence conditions are determined to be satisfied when a difference and a squared error from the preceding average single thread performance become predetermined threshold values or less. Even if a fixed termination count for the iterative calculation is set so that the error and so on do not reach the predetermined threshold values or less, it can be determined that the convergence conditions are satisfied, and the process can be terminated. The in-core model calculation portion 116 of this embodiment constitutes an initial-value setting portion, an in-core-task-distribution calculation portion, a single-thread performance update portion, and a termination-condition determination portion.

Subsequently, in steps S111 to S113, the inter-core model calculation portion 118 estimates the probability that tasks can migrate between cores using a queueing model with over a plurality of processor cores under the converged average single thread performance avgThreadPerf to calculate an expected value of the average response time.

In step S111, the computer system 10 calculates, with the inter-core model calculation portion 118, the probability $\pi_2[n]$ of presence of n number of tasks in the system (the plurality of processor cores) for a queue for the number of windows (the total sum of threads across a plurality of processor cores, c×t, where c is the number of processor cores), the average utilization ρ, the average service factor μ=avgThreadPerf. The value $\pi_2[n]$ can be calculated using the same calculation method as for $\pi_1[n]$, described above, except that the number of windows is c×t.

In step S112, the computer system 10 calculates, with the inter-core model calculation portion 118, migratability probability migratableRatio indicating the probability that the number of tasks is a threshold value or less in at least one of the c number of processor cores when n number of tasks are disposed at random in each core on the basis of the distribution of the probability $\pi_2[n]$ of the number of tasks present in the system. Here, the probability a[s] that s number (1≤s≤t) of tasks are executed in a processor core is calculated using Eqs. (6) and (7).

[Math. 4]

$$(s < t) \; a[s] = \sum_{n=s}^{c \cdot t} \left( \pi_2[n] \cdot C(n, s) \cdot \frac{(c-1)^{n-s}}{c^n} \right) \qquad (6)$$

$$(s = t) \; a[t] = 1.0 - \sum_{k=1}^{t-1} a[k] \qquad (7)$$

In Eq. (6), C(n, s) is the number of combinations of extraction of s number of tasks from n number of tasks. Eq. (6) calculates a[s] by obtaining the probability of presence of s number of tasks in a target core when the number of tasks is n from the number of combinations of s number of tasks present in the n number of tasks, the number of combinations of the n number of tasks and the c number of cores, and the number of combinations of n−s number of tasks not selected and c−1 number of cores other than the target core and by weighted-averaging the probability with $\pi_2[n]$.

The migratability probability migratableRatio is calculated using Eq. (8) by subtracting the probability that tasks exceeding a threshold value indicating acceptability are executed in the c−1 number of cores other than the target core (the probability of absence of acceptable cores) from 1.0. If migration is accepted only when no executable task is present, the threshold value, threshold, can be set to 0.

[Math. 5]

$$migratableRatio = 1.0 - \left( \sum_{s=threshold+1}^{t} a[s] \right)^{c-1} \qquad (8)$$

In step S113, the computer system 10 calculates, with the inter-core model calculation portion 118, an expected value W[t] of an average response time for the number of active threads t by using Eq. (9) from the calculated migratability probability migratableRatio and the waiting time Wq obtained finally in step S108. The average service factor μ is avgThreadPerf. Eq. (9) gives the average waiting time considering that the task scheduler 104 moves a task from a queue for a busy processor core to an idle core.

[Math. 6]

$$W[t] = W_q * (1 - migratableRatio) + 1/\mu \qquad (9)$$

If the process of the loop from steps S103 to S114 is performed on all the numbers of active threads t ($1 \le t \le t_{max}$), the expected values W[t] of average response times of all of the numbers of active threads t are obtained.

In step S115, the computer system 10 updates the setting of the number of active threads of the OS kernel 102 with the active-thread-setting update section 120 via the interface to the number of active threads t with which the expected value W[t] is the minimum. In step S116, a predetermined interval is waited, and the process is returned to step S101. The process from steps S101 to S116 is repeated at predetermined intervals (either regularly or irregularly when an event is driven).

Experimental Example

Installation in Computer

Two POWER7® processors with a clock number of 3.55 GHz and a 128-GB memory were used to constitute the computer system 10. ReadHat® Enterprise Linux® 6.4 (Kernel 2.6.32-358.2.1.el6) is used as the OS. The processors each have eight cores and a four-way SMT function. Accordingly, the number of processor cores is 16 in total, and the number of SMT threads (the number of logical CPUs) is a maximum of 64. A dynamic frequency scaling function was disabled to enhance the reproducibility.

The active-thread adjusting unit 110 was implemented as a program in a user space on the Linux® kernel to acquire CPU utilization data from /proc/Stat and to switch between active and inactive of the individual logical CPUs using an Sysfs interface (/sys/devices/system/cpu/cpuN/online) so that only a designated number of SMT threads become active in each processor core. In the experiment, the numbers of active threads were the same in all the cores.

The CPU utilization data was acquired every five seconds, the utilization state was evaluated using peak CPU utilization in past 60 seconds to prevent excessive changes in the number of active threads, and an optimum number of active threads was calculated. The execution efficiency at the individual degrees of parallelism in SMT was set to threadPerf[1-4]={1.0, 0.75, 0.57, 0.45} that statically uses typical values of the processor based on a measurement result in a typical application. Accordingly, the total performance of the SMT threads was {1.0, 1.5, 1.7, 1.8}.

An application, IBM® Cognos® Business Intelligence (BI) v10.2 for analyzing and visualizing business data stored in database was operated on an IBM® WebSphere® Application Server v8.5.

Figure 6:
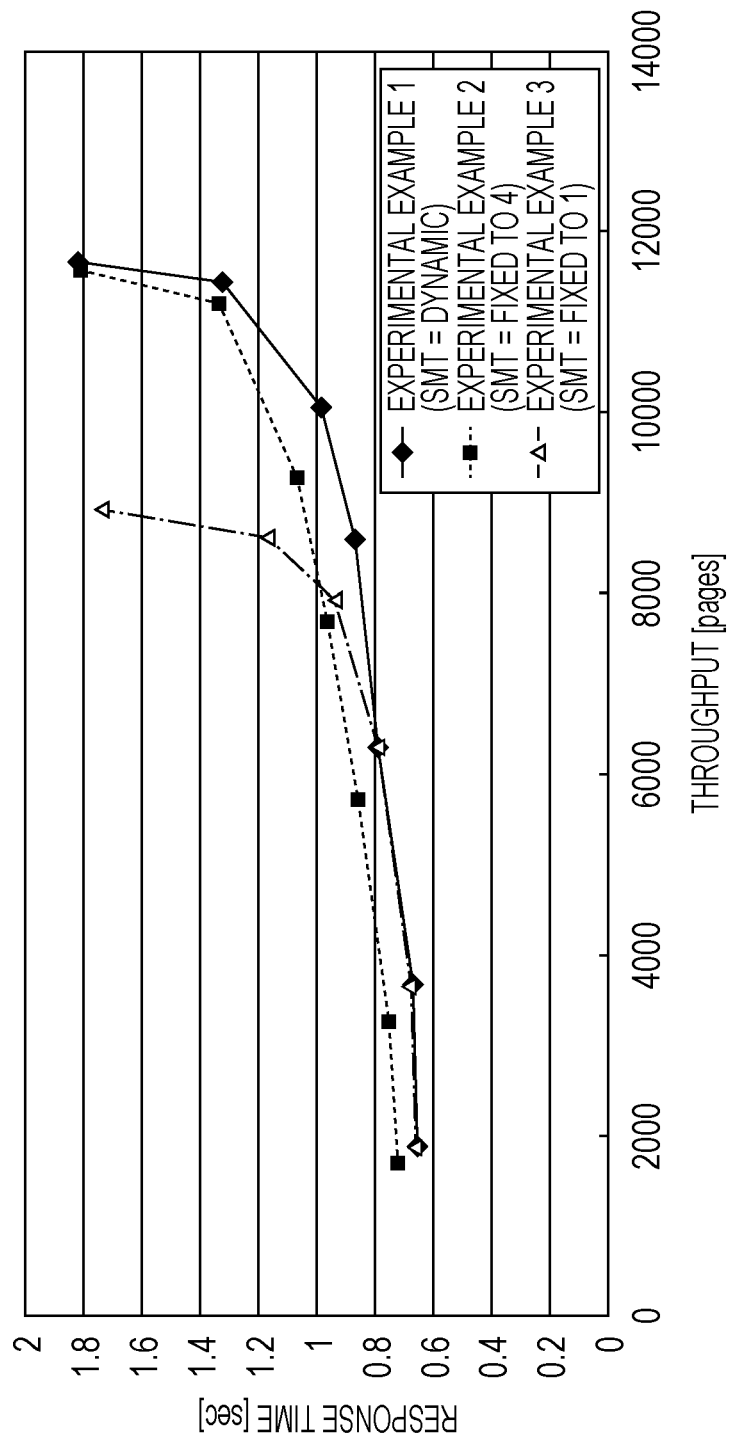
FIG. 6 is a graph of the average response time of an application with the computer system plotted against throughput on abscissa.

FIG. 6 is a graph of the average response time of Cognos® BI with the above computer system plotted against throughput on abscissa. A load was generated using a simulated client that transmits a request at intervals of a waiting time defined by random numbers with exponential distribution. In FIG. 6, Experimental Example 1 shows a response time in the case where the method for adjusting the number of active threads described above is executed, and Experimental Example 2 and Experimental Example 3 show response times in the case where the number of active threads is fixed to 4 and 1, respectively.

Referring to FIG. 6, Experimental Example 2 shows a case where the number of active threads is the largest, but the response time was worse than the case where the SMT function is disabled (SMT=1) in a low-throughput area corresponding to a case of a low load. In contrast, Experimental Example 3 shows that the response time was improved from the case of the largest number of threads (SMT=4) in the low-throughput area corresponding a low load but cannot sufficiently address high throughput.

In contrast, Experimental Example 1 in which the method for adjusting the number of active threads is executed shows that the response time was improved from the case of the largest number of threads (SMT=4) in the entire area of throughput, as is evident from FIG. 6. In this case, the number of SMT threads was decreased to 1 from the largest number 4 in the low-throughput area, and the response time increased by a maximum of 12%. As the load increases, the number of SMT threads used increased step by step to finally become equal to that in the case of the largest number of threads.

This shows that the method for adjusting the number of active threads can improve the response time by successfully selecting an optimum number of active threads. Applications other than the Cognos® BI showed a similar tendency, in other words, this method can be broadly applied to applications. Furthermore, overhead due to the calculations of the method for adjusting the number of active threads was negligible in terms of performance because of low frequency of calculations. Furthermore, even with a similar algorithm for adjusting the number of active threads based on simple queueing theory in which the number of logical CPUs is the number of windows, the number of active threads is directed to the largest number, thus producing no effect on improving the response time.

For AIX® 7.1 or later, a mode in which no other threads are used until the utilization of the first thread of the plurality of threads in each core reaches 50% is also known. However, such a simple adjusting method based on a static threshold value does not always allow selection of the number of threads with which the response time is the shortest.

As described above, according to embodiments of the present invention, a calculation method, a calculation apparatus, and a program for evaluating response time in the state of parallelism of predetermined units of execution in consideration of a conflict among the units of execution can be provided for a computer system in which a plurality of units of execution can be run in parallel on individual processor cores while sharing internal hardware resources. Furthermore, according to an embodiment of the present invention, a computer system can be provided which is capable of determining the state of parallelism of units of execution used depending on a load exerted on the system and capable of improving the response time particularly under a low load.

It is known that CPU utilization at normal times is not always high in actually running server systems. This leads to the assumption that the response time can be decreased in many actual systems. Furthermore, applications, such as a Web application, have the characteristic of having a large number of relatively short tasks of executing processes in response to requests from a client. Accordingly, it can be said that the calculation method of this embodiment can be suitably applied to applications in which a large number of short tasks are generated.

In the above embodiments, an optimum state of parallelism is determined on the assumption that all the processor cores 14 constituting the computer system 10 have the same number of active threads t ($1 \leq t \leq t_{max}$). However, in another embodiment, individual combinations of degrees of parallelism (the numbers of active threads) of a plurality of processor cores constituting a computer system can be evaluated to determine an optimum combination of degrees of parallelism. Although the number of cores in the system is assumed not to be changed during operation, it can be changed. Although the operating frequency of the processor cores is assumed not to be changed during operation, it can be changed by enabling the dynamic frequency scaling function.

In the above embodiments, the average single thread performance is updated by iterative calculation in an in-core model. However, in another embodiment, a model in which a waiting time is calculated without convergence calculations can be created, with which the single thread performance and the waiting time can be obtained.

In the above embodiments, the computer system 10 having an SMT function itself evaluates response time when the SMT function is enabled for individual numbers of threads in the present utilization state, and the setting is updated to an optimum number of active threads. However, in another embodiment, a computer separated from the target computer system 10 can assume a plurality of utilization states of the target computer system, can determine an optimum number of active threads for each of the plurality of assumed utilization states, and can record the setting of the optimum numbers of active threads on a table in correspondence with normalized CPU utilization or the range thereof. In this case, the computer system that implements the table can include the utilization-state evaluation section 112 that normalizes the present utilization state of the computer system and evaluates it and the active-thread-setting update section 120 that updates the setting of the number of active threads of the computer system. Instead of the response time calculation section 114, the computer system can read an optimum number of active threads for the normalized utilization with reference to the recorded table, and the number of active threads can be set by the active-thread-setting update section 120. The table can be information that associates the setting of optimum numbers of active threads with the number of cores, CPU utilization, or the range thereof for any general computer system having a plurality of processor cores.

The functions of the present invention can be achieved by a system-executable program described in a legacy programming language, such as an assembler, C, C++, C#, or Java®, or an object-oriented programming language and can be distributed as a system-readable recording medium or by transmission.

Although the present invention has been described with reference to specific embodiments, it is to be understood that the present invention is not limited to these embodiments, and that modifications can be made within the scope that those skilled in the art can consider, for example, other embodiments, addition, changes, and deletion, and any forms are included in the scope of the present invention provided that they offer the operational advantages of the present invention.

The invention claimed is:

1. A computer program product for evaluating a response time in a computer system, wherein a plurality of units of execution are run in parallel on individual processor cores while sharing internal hardware resources, the computer program product comprising a computer readable storage medium having computer readable instructions embodied therewith, the instructions executable by a computer to cause the computer to:
    normalize a utilization state of the computer system with the state of parallelism of the units of execution and evaluate the utilization state, wherein normalizing the utilization state comprises obtaining a utilization state of all CPU threads of the processor cores, and calculating a normalized utilization value from the obtained utilization state of each CPU thread with reference to a case in which a number of active threads is 1;
    calculate an expected value of response time in a desired state of parallelism of the units of execution from the normalized utilization state on the basis of queueing theory, wherein changes in an average single-thread performance of the units of execution according to the parallel running state are taken into account;
    determine a degree of parallelism or a combination of degrees of parallelism at which the calculated expected value of response time is optimized as the state of parallelism of the units of execution used in the utilization state; and
    update the state of parallelism of the units of execution used on the basis of the calculated result of the expected value of response time in the state of parallelism,
    wherein the plurality of units of execution are run in parallel on the individual processor cores using a simultaneous multi-threading (SMT) function, and the expected value of response time is calculated while the SMT function is enabled.

2. The computer program product according to claim 1, wherein accounting for changes in the average single-thread performance refers to calculating a waiting time in a queue by taking changes in the average single-thread performance according to a number of simultaneous operations of units of execution in a processor core at a moment as changes in an average service factor.

3. The computer program product according to claim 1, wherein:
    the computer system includes a plurality of processor cores; and
    the expected value of response time is calculated by:
    calculating a waiting time in a queue in which the number of units of execution in each processor core is the number of windows;
    calculating the migratability probability that at least one processor core capable of accepting a task from another processor core is present in a queue with the number of windows across the plurality of processor cores; and
    calculating an expected value of an average response time as the response time from the waiting time and the migratability probability.

4. The computer program product according to claim 1, wherein evaluating the utilization state comprises calculating normalized CPU utilization of the computer system from the single-thread performance of the units of execution at the individual degrees of parallelism and the utilization of the individual units of execution.

5. The computer program product according to claim 1, wherein the computer is separated from the computer system to be evaluated,
    evaluating the utilization state comprises assuming a plurality of utilization states of the computer system, and the instructions executable by the computer further cause the computer to:
    record the state of parallelism of units of execution used in association with the assumed individual plurality of utilization states.

6. The computer program product according to claim 1: wherein the unit of execution is a hardware thread.

7. A calculation apparatus for evaluating response time in a computer system, wherein a plurality of units of execution are run in parallel on individual processor cores while sharing internal hardware resources, the apparatus comprising:
    a memory storing a computer program; and
    a processor configured to execute the computer program, wherein the computer program is configured to:
    normalize a utilization state of the computer system with the state of parallelism of the units of execution and evaluate the utilization state, wherein normalizing the utilization state comprises obtaining a utilization state of all CPU threads of the processor cores, and calculating a normalized utilization value from the obtained utilization state of each CPU thread with reference to a case in which a number of active threads is 1;
    calculate an expected value of response time in a desired state of parallelism of the units of execution from the normalized utilization state on the basis of queueing theory, wherein changes in an average single-thread performance of the units of execution according to the parallel running state are taken into account;
    determine a degree of parallelism or a combination of degrees of parallelism at which the calculated expected value of response time is optimized as the state of parallelism of the units of execution used in the utilization state; and
    update the state of parallelism of the units of execution used on the basis of the calculated result of the expected value of response time in the state of parallelism,
    wherein the plurality of units of execution are run in parallel on the individual processor cores using a simultaneous multi-threading (SMT) function, and the expected value of response time is calculated while the SMT function is enabled.

8. The calculation apparatus according to claim 7, wherein the computer system includes a plurality of processor cores, and the computer program is further configured to:

calculate a waiting time in a queue, wherein the number of units of execution in each processor core is the number of windows;

calculate the migratability probability that at least one processor core capable of accepting a task from another processor core is present in a queue with the number of windows across the plurality of processor cores; and calculate an expected value of an average response time as the response time from the waiting time and the migratability probability.

9. The calculation apparatus according to claim 7, wherein the calculation apparatus is the computer system.

10. The calculation apparatus according to claim 7, wherein the calculation apparatus is separated from the computer system to be evaluated, and evaluating the utilization state comprises assuming a plurality of utilization states of the computer system, wherein the computer program is further configured to:

record the state of parallelism of units of execution used in association with the assumed individual plurality of utilization states.

* * * * *